United States Patent Office

3,790,499
Patented Feb. 5, 1974

3,790,499
CATALYST FOR THE PREPARATION OF
POLYETHER-TYPE POLYMERS
Anne C. Udding, Amsterdam, Netherlands, assignor to
Shell Oil Company, New York, N.Y.
No Drawing. Filed July 23, 1971, Ser. No. 165,705
Claims priority, application Netherlands, July 30, 1970,
7011318
Int. Cl. C08g 23/14
U.S. Cl. 252—431 R    4 Claims

ABSTRACT OF THE DISCLOSURE

Cyclic ethers are polymerized in the presence of a sulfur-containing catalyst formed by reacting a compound of a trivalent metal of the formula (RO)(RO)M'—OX with a compound of a divalent metal of the formula

YO—M—Z wherein M' is a trivalent metal of Groups III to VI and VIII of the periodic system; M is a divalent metal or a metal-containing group, the metal of which has two free valances, of Groups I, II and IV to VIII of the periodic system; Z is an OR group or a hydrocarbylsulfinyloxy group; one of the symbols X and Y represents an R group, the other representing a hydrocarbylsulfinyl group; and R, which may be similar or dissimilar, denotes a monovalent hydrocarbyl group of 1 to 6 carbon atoms. The polymeric products are useful plastics or rubbers.

---

The invention relates to a new process for the preparation of polyether-type homopolymers and/or copolymers. More particularly, the invention relates to polymerizing cyclic ethers, using a novel and very active catalyst system. The invention further relates to novel polymerization catalysts and to a method of preparing them.

It is known from British Pat. 1,150,665 to polymerize cyclic ethers containing or 4 atoms in the ring, such as the 1,2-epoxides and the oxetanes, by means of a catalyst prepared without the use of a metal hydrocarbyl compound. Specifically these prior art catalysts are prepared by reacting a compound of a trivalent metal of the formula (RO)(RO)M'—OX with a compound of a divalent metal of the formula

YO—M—Z in which formulae M' is a trivalent metal, M is a divalent or metal-containing group the metal of which has two free valances, Z is a —OR or an acyloxy group, one of the symbols X or Y is an R group the other being an acyl group, and R and R are monovalent hydrocarbon groups. When preparing the catalyst in this manner, an ester of the formula

XOY is also formed, and is preferably removed. The structure of the catalyst is not precisely known; however, it will be appreciated that it does not contain bound sulfur.

A new process has now been found for the polymerization of cyclic ethers employing a novel catalyst having a sulfur-containing structure and more active than the catalysts mentioned above.

According to the invention, polyether-type homopolymers and/or copolymers are prepared by a process which comprises polymerizing at least one cyclic ether of the formula

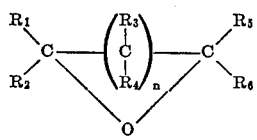

(I)

wherein $n$ is 0 or 1 and $R_1$, $R_2$, $R_3$, $R_4$, $R_5$ and $R_6$ each individually represent a hydrogen or a hydrocarbyl group, which group may be substituted by a halogen atom or a hydrocarbyloxy group, and in which $R_1$ and $R_5$ may be linked together to form a cycloaliphatic ring, in the presence of a catalyst formed by reacting a compound of a trivalent metal of the formula (RO)(RO)—M'—OX    (A)

with a compound of a divalent metal of the formula

YO—M—Z    (B)

in which formulae M' is a trivalent metal selected from metals in Groups III to IV and VIII of the Periodic Table and M is selected from divalent metals and chemical groups of divalent metals and Z is selected from an OR group or a hydrocarbyl sulfinyloxy group, one of the two symbols X and Y is an R group and the other a hydrocarbyl sulfinyl group and R represents a monovalent hydrocarbyl group of 1 to 6 carbon atoms which may be similar or dissimilar.

Examples of cyclic ethers which may be polymerized by the novel process are ethylene oxide proplyene oxide, the butylene oxides, epichlorohydrin, epibromohydrin, the alkyl glycidyl ethers such as those in which the alkyl group contains 1 to 8 carbon atoms; the aryl glycidyl ethers such as phenyl glycidyl ether, styrene oxide, cyclohexane oxide, butadiene monoxide or dioxide, vinyl glycidyl ether, allyl glycidyl ether, crotyl glycidyl ether, the allyl phenyl glyl cidyl ethers, the crotyl phenyl glycidyl ethers, vinyl cyclohexene monoxide, as well as the oxetanes such as trimethylene oxide, and finally the substitution products of these ethers in which at least one hydrogen atom is replaced by a halogen atom. According to the process of the invention these ethers can be used to prepare homopolymers. In the latter case two, three or more representatives of the said ethers may be copolymerized with each other.

Preferred are vicinal poxides, i.e., the cyclic ethers of Formula I wherein $n=0$. Particularly preferred are ethylene oxide, propylene oxide, styrene oxide, phenyl glycidyl ether, allyl glycidyl ether and butadiene monoxide. Most preferred is propylene oxide and mixtures thereof with an unsaturated cyclic ether, such as, for example, allyl glycidyl ether or butadiene monoxide; mixtures of these together with a third monomer, such as phenyl glycidyl ether, are also preferred. In Formula I the symbols $R_1$, $R_2$, $R_3$, $R_4$, $R_5$ and $R_6$ may individually each represent a hydrocarbly group containing up to about 8 carbon atoms.

Another aspect of the invention is a process for preparing the polymerization catalyst which comprises reacting a compound of a trivalent metal of the formula

with a compound of a divalent metal of the formula $$YO—M—Z \quad (B)$$

in which Formulae A and B the symbols are defined as in British Pat. 1,150,665, except that for symbols Z, X and Y, the term "acyl" is replaced by "hydrocarbyl sulfinyl." Although the structure of the catalyst according to the invention is not precisely known, it was possible to establish that they contain sulfur, which is present as a sulfinate group.

In preparing the catalyst according to the invention it is preferred to react as catalyst-forming components a compound of the Formula A referred to above, wherein X is exclusively a hydrocarbyl group, and a compound of the Formula B referred to above, wherein Y exclusively represents a hydrocarbyl sulfinyl group and Z exclusively represents a hydrocarbyl sulfinyloxy group.

Preferably, the hydrocarbyl groups mentioned above are alkyl groups having from 1 to 6 carbon atoms, the hydrocarbyl group in the hydrocarbyl sulfinyl and the hydrocarbyl sulfinyloxy groups preferably being an aryl or alkaryl group.

The trivalent metal M' may, for example, be a trivalent metal of the Groups III to VI and VIII of the periodic system, while the divalent metal M may belong, for example, to the Groups I, II and IV to VIII. The periodic system herein refers to the Periodic Table of Elements, "Handbook of Chemistry and Physics," Chemical Rubber Co., 50th ed. (1969), page B–3. Examples of representatives of the metal M' are aluminum, iron, molybdenum, chromium, vanadium, titanium, zirconium, boron, gallium, scandium, indium, thallium and bismuth. Aluminum is most preferred.

Examples of the divalent metal M or the divalent metal-containing group M are copper, beryllium, magnesium, zinc, cadmium, calcium, strontium, barium, tin, titanium, vanadium, vandyl (VO), titanyl (TiO), palladium, platinum, chromium, uranyl ($UO_2$), zirconyl (ZrO), nickel, cobalt, iron, manganese, molybdenum, $R_2Sn$ (IV), wherein R represents a monovalent hydrocarbyl group and CpTi (IV), wherein Cp represents a cyclopentadienyl group. The divalent metal zinc is most preferred.

It has been found that by far the best results are obtained with catalysts produced by carrying out the reaction between (A) and (B) in the presence of 0.25–3 mol of free or bound water per mol of (B), preferably 0.5–2.5 mol of water per mol of (B). A very attractive manner of meeting this condition is by using a zinc aryl or a zinc aralkyl sulfinate with 2 molecules of bound water of crystallization as Compound B. Most preferably is an aluminum trialkoxide as Compound A is reacted with a zinc diaryl or a zinc dialkaryl sulfinate·$2H_2O$ as Compound B.

Further, if the catalyst is prepared in the presence of water it is highly advisable that as much as possible of the alcohol which is liberated should be removed before the reaction produce is used as catalyst.

During the reaction between (A) and (B) the molar ratio of $A:B$ is preferably between 0.01:1 and 100:1; particularly preferred are molar ratios between 0.1:1 and 10:1. The preferred temperature for this reaction is between 50° C. and 300° C.

A particularly active catalyst can be obtained by reacting a fresh quantity of (A), for example 0.1–2 times and preferably amount of (A) 0.25–1 time the quantity originally used, with the reaction product of (A) and (B). Finally, even when the reaction between (A) and (B) is carried out in the presence of water, it is advisable for the reaction product to be used as catalyst in the anhydrous state.

The catalyst is usually prepared with the use of a solvent; the polymerization can be carried out either in the presence or in the absence of a solvent or diluent. Solvents which may be used include ethers, for example dialkyl, aryl or cycloalkyl ethers, e.g., diethyl ether, aromatic hydrocarbons, for example benzene, toluene or xylene, saturated aliphatic or cycloaliphatic hydrocarbons, for example n-heptane or cyclohexane, tetrahydronaphthalene and decahydronaphthalene and halogenated hydrocarbons such as methyl chloride, methylene chloride, chloroform, carbon tetrachloride and dichloroethane.

If desired, the catalyst preparation may be followed by a treatment of the reaction product with a primary alcohol.

In the polymerization process according to the invention the catalyst is usually used in the dissolved state and in quantities between 0.001 and 30 gram-atoms, preferably between 0.5 and 5 gram-atoms of metal ($M+M'$) per 100 mol of monomer (or mixture of monomers). As a rule the catalysts are most soluble in aromatic solvents.

Polymerization preferably takes place with the exclusion of oxygen and moisture. The polymerization temperature may vary within wide limits, for example between $-80°$ C. and $+200°$ C., preferably between 20° C. and 120° C.

The polymerization products are rubbers or plastics, depending on the monomers and/or monomer ratios used. Examples of rubbery products are the homopolymers of propylene oxide, of epichlorohydrin and of butadiene monoxide and furthermore, the copolymers of epichlorohydrin and ethylene oxide and/or propylene oxide, as well as the copolymers which consist predominantly of structural units originating from propylene oxide. The rubbery products may be vulcanized if desired, for example by means of peroxides, or if they have sufficient unsaturation (as may be the case, for example, if butadiene monoxide or allyl glycidyl ether is used as comonomer) by means of sulfur-based vulcanizing systems. As a rule the vulcanates have good ozone and ageing stability. Generally, the use of propylene oxide in the homo- or copolymerization will result in improved low-temperature performance of the final product.

The invention will be elucidated by the following examples.

EXAMPLE I

A dry, 250-ml. three-necked flask, provided with a nitrogen inlet tube, a stirrer and a Dean and Stark trap with condenser, was filled with dry pure nitrogen. A quantity of 50 ml. of dry nitrogen-saturated tetrahydronaphthalene, 5.10 g. (0.0250 mol) of aluminum tri-isopropoxide and 4.69 g. (0.0114 mol) of zinc para-toluene sulfinate with 2 molecules of water of crystallization ($Zn(—O—S(O)—\phi—CH_3)_2.2H_2O$) were subsequently introduced into the flask which, under agitation, was placed in an oil bath, the temperature of which was 170° C. After a few minutes the suspension initially present in the flask became a clear solution with the formation of 2-propanol, which had a purity of 29.4% by weight as determined by gas chromatographic analysis. This alcohol was removed by means of the Dean and Stark trap. The temperature of the oil bath was then raised to 220° C. over a period of 30 minutes and the flask was kept at this bath temperature of 3.5 hours. The solution present in the flask, which at this point contained very little undissolved matter, had a yellowish-brown color. This solution was subsequently concentrated by evaporation under a nitrogen atmosphere at a maximum temperature of 150° C. and a pressure of 0.02 mm. Hg. The solid residue which contained 31.6% by weight of carbon, 3.9% by weight of hydrogen, 10.8% by weight of sulfur, 11.7% by weight of aluminum and 12.4% by weight of zinc (atomic ratio Al/Zn=2.26), was dissolved under a nitrogen atmosphere and kept in 30 ml. of dry toluene.

EXAMPLE II

The catalyst preparation described in Example I was repeated except that the temperature of the oil bath was raised from 170° C. to 189° C. and that in this case the flask was kept at this bath temperature for 16 hours.

EXAMPLE III

The catalyst preparation described in Example I was repeated except that the bath temperature was raised to 225° C. instead of 220° C. Again, the worked-up residue was dissolved under a nitrogen atmosphere and kept in 30 ml. of dry toluene.

Some of this catalyst solution was analyzed under a nitrogen atmosphere and with the exclusion of moisture and oxygen. The toluene was first distilled off and the residue washed with dry heptane, in which no detectable quantity of catalyst was found to dissolve. The washed catalyst contained 32.0% by weight of carbon, 3.5% by weight of hydrogen and 12.4% by weight of sulfur. Acid hydrolysis yielded a hydrolysis product which contained less than 50 micrograms of 2-propanol per gram of catalyst. Infra-red analysis of a solution of the catalyst in chloroform resulted in a spectrum with absorptions characteristic of the para-toluene sulfinate group and in which no isopropyl groups could be detected.

EXAMPLE IV

The catalyst preparation described in Example I was repeated except that the quantity of zinc-paratoluene sulfinate with two molecules of water of crystallization was 5.14 g. (0.0125 mol), that the flask was kept for 4 hours at the bath temperature raised to 220° C. (from 170° C.), a clear yellowish-green solution being obtained and that this solution was concentrated by evaporation at a maximum temperature of 160° C. and a pressure of 0.04 mm. Hg. The resulting quantity of residue (6.0 g.) was dissolved under a nitrogen atmosphere and kept in 60 ml. of dry toluene. This solution was found to contain 0.43 milliatoms of sulfur per ml.; the molecular weight of the residue was approximately 800.

EXAMPLE V

The catalyst preparation described in Example I was repeated except that 4.31 g. (0.0113 mol) of zinc benzene sulfinate·$2H_2O$ was used. The resulting reaction mixture had an ochre color and contained a small quantity of undissolved matter. The solution was concentrated by evaporation at a maximum temperature of 160° C. and a pressure of 0.05 mm. Hg. The resulting residue was taken up under a nitrogen atmosphere in 30 ml. of dry toluene, in which the greater part dissolved.

EXAMPLE VI

The catalyst preparation described in Example I was repeated except that 4.05 g. (0.025 mol) of aluminum triethoxide was used. The catalyst was concentrated by evaporation under a nitrogen atmosphere and under nitrogen was taken up in 30 ml. of dry toluene and dissolved therein for the greater part.

EXAMPLE VII

In the apparatus described in Example I a quantity of 5.14 g. (0.0125 mol) of zinc para-toluene sulfinate·$2H_2O$ was first dehydrated by suspending it in 50 ml. of toluene and distilling off the water as an azeotropic mixture with toluene from the suspension thus obtained, subsequently adding 50 ml. of tetrahydronaphthalene and removing the last remnants of toluene and water at an oil bath temperature of 150° C. After cooling to room temperature under a nitrogen atmosphere, a quantity of 5.10 g. (0.025 mol) of aluminum tri-isopropoxide was added and the flask immersed in an oil bath, the temperature of which has been brought to 140° C. The oil bath temperature was then gradually raised to 210° C. over 3.5 hours, during which time the color of the reaction mixture slowly turned dark and contrary to the experiments described in the previous examples no volatile reaction product (2-propanol) was formed. The contents of the flask were then concentrated by evaporation under reduced pressure, whereupon 30 ml. of dry toluene was added to the residue under a nitrogen atmosphere, forming a dark-colored suspension.

EXAMPLE VIII

In the same manner as described in Example VII a catalyst was prepared via the same quantity of dehydrated zinc para-toluene sulfinate·$2H_2O$. In this case, however, the quantity of aluminum tri-isopropoxide was only 2.55 g. (0.0125 mol), while after the addition thereof the reaction was started up at a bath temperature of 170° C. The bath temperature was raised over 30 minutes to 180° C. and the flask was kept at this temperature for a further 60 minutes. After cooling, the dark-colored suspension was concentrated by evaporation under reduced pressure and the residue was mixed under a nitrogen atmosphere with 30 ml. of dry toluene, forming a dark-colored suspension.

EXAMPLE IX

A quantity of 50 ml. of tetrahydronaphthalene, 5.10 g. (0.025 mol) of aluminum tri-isopropoxide and 5.14 g. (0.0125 mol) of zinc para-toluene sulfinate·$2H_2O$ was introduced under a nitrogen atmosphere into the apparatus described in Example I. The reaction was started up by immersing the flask in an oil bath at a temperature of 170° C., whereupon the bath temperature was raised over 30 minutes to 220° C. After the flask had been kept at this temperature for 2 hours, an additional quantity of 2.55 g. (0.0125 mol) of aluminum tri-isopropoxide was added and the reaction mixture kept at 224° C. for a further two hours. The resulting brown solution was subsequently concentrated by evaporation under reduced pressure and the residue, which had a yellowish-brown color and amounted to 7.92 g., was taken up under a nitrogen atmosphere in 30 ml. of toluene, in which the greater part dissolved.

EXAMPLE X

The catalyst preparation described in Example I was repeated except that in this case use was made of 10.20 g. (0.05 mol) of aluminum tri-isopropoxide, 10.28 g. (0.025 mol) of zinc para-toluene sulfinate·$2H_2O$ and 100 ml. tetrahydronaphthalene. The quantity of catalyst obtained after concentration by evaporation was 12.5 g., which was dissolved under a nitrogen atmosphere and kept in 60 ml. of dry toluene.

EXAMPLE XI

Fifty ml. of tetrahydronaphthalene, 5.10 g. of aluminum tri-isopropoxide (0.025 mol) and 4.69 g. (0.0114 mol) of zinc para-toluene sulfinate·$2H_2O$ were successfully introduced into the apparatus described in Example I. The flask was immersed in an oil bath, the temperature of which was 160° C., whereupon the bath temperature was raised over 30 minutes to 220° C. and the reaction mixture was kept at this temperature for 2 hours. The tetrahydronaphthalene was subsequently evaporated at a maximum temperature of 190° C. under a pressure of 1 mm. Hg and the resulting solid residue was dissolved under a nitrogen atmosphere in 30 ml. of dry toluene.

EXAMPLE XII

The comparison, the catalyst preparation described in Example XI was repeated except that in this case sulfinate was replaced by 2.30 g. (0.0125 mol) of anhydrous zinc acetate. The catalyst solution, obtained by dissolving the solid residue under a nitrogen atmosphere in 30 ml. of dry toluene, had a yellowish-green color.

EXAMPLE XIII

A number of polymerization experiments were carried out (Nos. 1–11), 10 ml. of propylene oxide in each case being polymerized at 50° C. with the exclusion of air and moisture, in the presence of a dry oxygen-free solvent, been prepared according to Example I. Further details and the results obtained are shown in Table II.

TABLE II

| Experiment number | Catalyst solution prepared according to example | Solvent for polymerization | Monomer composition | Monomer ratio, mole percent | Polymerization time, hr. | Polymer Yield, percent by weight | I.V., dl./g. |
|---|---|---|---|---|---|---|---|
| 12 | X | Toluene | PO | ---------- | 6 | 87 | 7.6 |
| 13 | X | ----do---- | EO | ---------- | 6 | 100 | 2.6 |
| 14 | I | Heptane | ECH | ---------- | 8 | 12 | ¹0.4 |
| 15 | X | Toluene | PGE | ---------- | 6 | 92 | (²) |
| 16 | X | ----do---- | AGE | ---------- | 24 | 41 | 1.5 |
| 17 | X | ----do---- | SO | ---------- | 24 | 39 | (²) |
| 18 | X | ----do---- | PO-EO | 50:50 | 6 | 94 | 3.7 |
| 19 | X | ----do---- | PO-SO | 50:50 | 24 | 49 | (²) |
| 20 | X | ----do---- | EO-PGE | 50:50 | 24 | 98 | (²) |
| 21 | X | ----do---- | EO-SO | 50:50 | 24 | 45 | (²) |
| 22 | I | ----do---- | ECH-PO | 50:50 | 48 | 42 | ¹0.7 |
| 23 | X | ----do---- | PO-PGE | 94.7:5.3 | 6 | 65 | 7.4 |
| 24 | X | ----do---- | PO-PGE | 82.2:17.8 | 6 | 90 | 5.7 |
| 25 | X | ----do---- | PO-PGE | 66.4:33.6 | 6 | 83 | 4.0 |
| 26 | X | ----do---- | PO-PGE | 18.0:82.0 | 6 | 93 | (²) |
| 27 | X | ----do---- | PO-AGE | 97.0:3.0 | 6 | 89 | 6.8 |
| 28 | X | ----do---- | PGE-AGE | 94.2:5.8 | 6 | 90 | (²) |

¹ Of the toluene-soluble fraction of the polymer.
² Insoluble.

NOTE.—PO=propylene oxide, ECH=epichlorohydrin, AGE=allyl glycidyl ether, EO=ethylene oxide, PGE=phenyl glycidyl ether, SO=styrene oxide.

using $\frac{1}{15}$ part of a catalyst solution or suspension prepared as described in any of the previous examples. At the beginning of each experiment the polymerization reactor, which had a content of 100 ml., was filled with dry pure nitrogen. The propylene oxide had been previously purified by first boiling it with solid potassium hydroxide, then distilling it off and subsequently distilling it over calcium hydride. The polymerizations were terminated by the addition of ethanol of 96% concentration. After concentration of the resulting mixture by evaporation under reduced pressure at 40° C.–50° C., the yield of dry polymer was determined, whereupon the values found were corrected for the content of catalyst remnants. The inherent viscosity (I.V.) of the polymers was determined in toluene at 30° C., in a polymer concentration of 100 mg. per 100 ml. of toluene. Further data concerning the catalyst, the solvent in which the polymerization was carried out and the polymerization time, as well as the results obtained, are summarized in Table I. A dash in the I.V. column of this table means that the I.V. was not determined. From experiment number 9 it is clear, that a catalyst prepared with the use of an additional quantity of aluminum hydrocarbyloxy compounds had a considerably higher activity (polymer yield 81% by weight after as little as 3 hours). Experiment number 11 does not relate to the present invention but is given for comparison.

TABLE I.—HOMOPOLYMERIZATION OF PROPYLENE OXIDE

| Experiment number | Catalyst solution Prepared according to example | Catalyst solution Quantity, ml. | Solvent for polymerization Name | Solvent for polymerization Quantity, ml. | Polymerization time, hr. | Polymer Yield, percent by weight | I.V., dl./g. |
|---|---|---|---|---|---|---|---|
| 1 | I | 2 | Heptane | 38 | 6 | 97 | 3.9 |
| 2 | II | 2 | Hexane | 38 | 6 | 70 | — |
| 3 | III | 2 | Toluene | 38 | 6 | 91 | 6.5 |
| 4 | IV | 4 | ----do---- | 36 | 6 | 91 | 3.5 |
| 5 | V | 2 | Heptane | 38 | 6 | 64 | 4.4 |
| 6 | VI | 2 | Toluene | 38 | 6 | 94 | 3.2 |
| 7 | VII | 2 | ----do---- | 38 | 6 | 7 | — |
| 8 | VIII | 3 | ----do---- | 37 | 6 | 3 | — |
| 9 | IX | 2 | ----do---- | 38 | 3 | 81 | 3.8 |
| 10 | XI | 2 | Heptane | 38 | 6 | 86 | 3.4 |
| 11 | XII | 2 | ----do---- | 38 | 6 | 60 | 6.9 |

EXAMPLE XIV

A number of homopolymerizations and copolymerizations (experiment Nos. 12–27) were carried out at 50° C. on the same scale and by the same procedure as described in Example XIII. Again, the quantity of monomer was 10 ml. the quantity of catalyst solution was invariably 2 ml. and the quantity of solvent invariably 38 ml. The catalyst solution was prepared according to Example X, except in the experiments 14 and 22, in which use was made of a catalyst solution which had

EXAMPLE XV

Twenty ml. of catalyst solution prepared according to Example X was added to a solution of 95 ml. of dry, pure and oxygen-free propylene oxide (97 mole percent) and 5 ml. of likewise dry, pure and oxygen-free allyl glycidyl ether (3 mole percent) in 380 ml. of toluene. This mixture was kept at 50° for 6 hours, whereupon the concomitant copolymerization was terminated by the addition of ethanol of 96% concentration, which contained 4-methyl-2,6-ditert-butyl phenol as antioxidant. The resulting copolymer was dried at 40° C. under reduced pressure and subsequently weighed. The yield was found to be 71 g. of elastic material. After correction for the catalyst residue the yield was 81% by weight. The copolymer had an inherent viscosity (I.V.) of 6.8 dl./g.

Using the following recipe in which numbers represent parts by weight, a composition was prepared from the copolymer:

| | |
|---|---|
| Copolymer | 100 |
| Sulfur | 1.5 |
| Tetramethyl thiuramdisulfide | 0.75 |
| Stearic acid | 1.0 |
| Zinc oxide | 4 |
| HAF | 50 |
| (2-mercaptobenzthiazole) | 0.5 |
| Nickel dibutyl dithiocarbamate | 1.0 |
| Selenium dimethyl dithiocarbamate | 1.0 |

This mixture was vulcanized under pressure for 29 minutes at 150° C. to form a rubber having the following properties:

| | |
|---|---|
| Tensile strength ASTM, D 412, Die C) kg./cm.² | 154 |
| 300% modulus kg./cm.² | 87 |
| Tear resistance (ASTM, D 624-54, Die C, Angle) kg./cm.² | 93 |
| Ultimate elongation percent | 551 |
| Set at break do | 24 |
| "Shore A" hardness | 62 |

EXAMPLE XVI

In the same manner as described in Example XV, two copolymerizations were carried out, but in this case the molar ratios of propylene oxide (PO) to allyl glycidyl ether (AGE) were 94:6 and 87:13 instead of 97:3. The yields corrected for the catalyst residue and the properties of the resulting rubbers are shown in Table III. Dashes mean "not determined."

TABLE III

| Monomer-molar ratio PO:AGE | Yield, percent by weight | I.V. in toluene at 30° C., dl./g. | Tensile strength, kg./cm.² | 300% modulus, kg./cm.² | Tear strength, kg./cm. | Ultimate elongation | Set at break, percent | "Shore A" hardness |
|---|---|---|---|---|---|---|---|---|
| 96:6 | 90 | 3.0 | 145 | 107 | — | 142 | 27 | — |
| 87:13 | 91 | 3.4 | 134 | — | 37 | 292 | 13 | 67 |

I claim as my invention:

1. A process for preparing a polymerization catalyst which comprises reacting a compound of a trivalent metal of the formula

with a compound of a divalent metal of the formula $$YO-M-Z \quad (B)$$

in which Formula M' is aluminium, M is zinc and Z is an OR group or a hydrocarbyl sulfinyloxy group, one of the two symbols X and Y is an R group and the other a hydrocarbyl sulfinyl group, and R, which may be similar or dissimilar, is a monovalent hydrocarbyl group of 1 to 6 carbon atoms; the ratio of Components A to B being in the range between 0.1:1 and 100:1; and at a temperature between 50 and 300° C.; and reaction being carried out in the presence of 0.25 to 3 moles of water per mole of (B).

2. A process as in claim 1 wherein X represents a hydrocarbyl group, Y is a hydrocarbyl sulfinyl group and Z a hydrocarbyl sulfinyloxy group.

3. A process as in claim 1 wherein the compound of Formula A is an aluminum tri-alkoxide and the compound of Formula B is selected from the group consisting of zinc diaryl sulfinate and a zinc dialkaryl sulfinate.

4. The catalyst prepared by the process of claim 1.

References Cited

UNITED STATES PATENTS

| | | | |
|---|---|---|---|
| 3,384,603 | 5/1968 | Elfers | 252—431 R |
| 3,432,445 | 3/1969 | Osgan et al. | 252—431 R |
| 3,542,698 | 11/1970 | Lal | 252—431 R |
| 3,580,866 | 5/1971 | Ito et al. | 252—431 R |

PATRICK P. GARVIN, Primary Examiner

U.S. Cl. X.R.

260—2 EP, 2 A